United States Patent Office 3,644,440
Patented Feb. 22, 1972

3,644,440
6-SUBSTITUTED-13-POLYCARBON-ALKYL-18,19-DINORPREGN-4-EN-3-ONES
George H. Douglas, Paoli, Daniel M. Teller, King of Prussia, and Herchel Smith, Wayne, Pa., assignors to American Home Products Corporation, New York, N.Y.
No Drawing. Continuation-in-part of application Ser. No. 748,606, July 30, 1968. This application May 19, 1969, Ser. No. 825,974
Int. Cl. C07c *169/32, 169/34*
U.S. Cl. 260—397.4     2 Claims

ABSTRACT OF THE DISCLOSURE

New steroids of the 13 - polycarbonalkyl-18,19-dinorpregn-4-en-3-one series and $\Delta^6$-dehydro analogs thereof, substituted at $C_6$ by methyl, chloro, bromo or fluoro; at $C_{17}$ by hydrogen, hydroxy or acyloxy, and wherein $C_{20}$ is carbonyl, hydroxymethylene or acyloxymethylene (I) have hormonal activity, especially as progestational and anti-estrogenic agents. Means to obtain them are provided comprising (a) hydrogenating the corresponding 6-methylene compound (II) to form the 6α-methyl-4-en-3-one (Id); (b) rearranging (II) with a weak base+Pd/C to form the 6-methyl-4,6-dien-3-one (Ie); (c) chlorinating or brominating the corresponding 3-enol ester (III) to form the 6-chloro or -bromo-4-en-3-one (If); and (d) either (1) dehydrogenating (If) with chloranil to form the 6-chloro or -bromo-4,6-dien-3-one (Ig), or preferably, (2) reacting the corresponding 6α,7α-epoxide (IV) with HCl, HBr or HF to form the corresponding 6-chloro, -bromo or -fluoro-4,6-dien-3-one (Ih).

This application is a continuation-in-part of copending application Ser. No. 748,606, filed July 30, 1968, now abandoned.

This invention is concerned generally with novel steroid compounds and with processes for preparing and using the same, and with useful intermediates therefor. More particularly it relates to steroids of the 6-substituted-13-polycarbonalkyl-18,19-dinopregn-4-en-3-one series, and to intermediates and processes for producing them.

DESCRIPTION OF THE INVENTION

This invention contemplates, in essence, *first,* steroid compounds of Formula I:

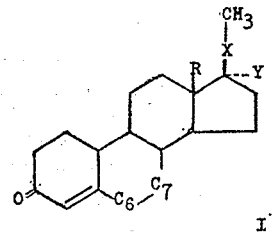

I wherein
R is alkyl of from about 2 to about 6 carbon atoms;
X is C=O or C(H)OR¹ wherein R¹ is hydrogen or (lower) alkanoyl;
Y is H, OH or OCOR² wherein R² is (lower)alkyl; and
—C₆–C₇— is a divalent radical of the formulae:

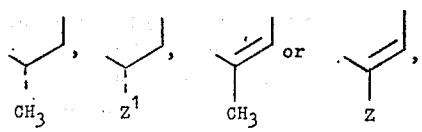

wherein
Z is chloro, bromo or fluoro and
Z¹ is chloro or bromo
provided that when X is C=O and Y is H, —C₆–C₇— is other than

The term "(lower) alkyl" includes hydrocarbon chains of from about 1 to about 6 carbon atoms, both straight chain and branched, and illustrative members of which are methyl, ethyl, n-propyl, i-propyl, n-butyl, s-butyl, t-butyl, n-pentyl, isopentyl, hexyl and the like. The term "polycarbon alkyl" contemplates polycarbon(lower)-alkyl, containing from about 2 to about 6 carbon atoms and includes groups illustrated above, but excluding the methyl group; the ethyl group is preferred. The term "(lower) alkanoyl" contemplates groups of the formula (lower) alkyl-CO—, wherein "(lower)alkyl" is above defined; acetyl is preferred.

Special mention is made of a number of valubale embodiments of the instant invention. There are:

*Second,* compounds of Formula Ia:

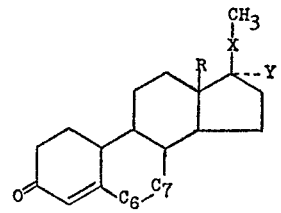

wherein R is alkyl of from about 2 to about 6 carbon atoms; X is C=O or C(H)OR¹ wherein R¹ is hydrogen or (lower)alkanoyl; Y is H, OH or OCOR² wherein R² is (lower)alkyl; and —C₆–C₇— is a divalent radical of the formulae:

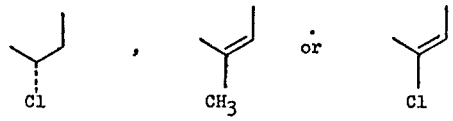

*Third,* 13β-ethyl - 20ξ - hydroxy-6-methyl-18,19-dinorpregna-4,6-dien-3-one, a compound of Formula Ia wherein R is ethyl, X is C(H)OH, Y is H and —C₆–C₇— is

*Fourth,* a compound selected from the group consisting of 13β-ethyl-17α-hydroxy-6-methyl-18,19-dinorpregna-4,6-diene-3,20-dione and the 17α-acetate ester thereof, i.e., compounds of Formula Ia wherein R is ethyl, X is C=O, Y is OH or OCOCH₃, respectively, and —C₆–C₇— is

*Fifth,* 13β-ethyl-6α-chloro-18,19-dinorpregn-4-en-3-on-20-ol, acetate, a compound of Formula Ia wherein R is ethyl, X is C(H)OCOCH₃, Y is H and —C₆–C₇— is

*Sixth,* 13β-ethyl-6-chloro - 18,19 - dinorpregna-4,6-dien-3-on-20-ol, acetate, a compound of Formula Ia wherein R is ethyl, X is C(H)OCOCH₃, Y is H and —C₆–C₇— is

*Seventh,* 13β-ethyl-6α-chloro - 18,19 - dinorpregn-4-en-3,20-dion-17α-ol, acetate, a compound of Formula Ia wherein R is ethyl, X is C=O, Y is OCOCH₃, and —C₆–C₇— is

*Eighth,* 13β-ethyl-6-chloro - 18,19 - dinorpregna-4,6-dien-3,20-dion-17α-ol, acetate, a compound of Formula Ia wherein R is ethyl, X is C=O, Y is OCOCH₃ and —C₆–C₇— is

*Ninth,* 13β-ethyl-6-chloro-17α-hydroxy - 18,19 - dinorpregna-4,6-dien-3,20-dione, a compound of Formula Ia wherein R is ethyl, X is C=O, Y is OH and —C₆–C₇— is

*Tenth,* compound of Formula Ib:

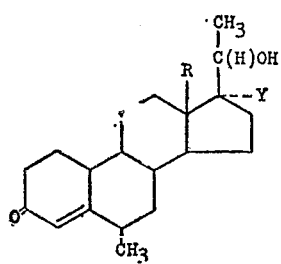

wherein R is alkyl of from about 2 to about 6 carbon atoms; and Y is H, OH or OCOR² wherein R² is (lower) alkyl.

*Eleventh,* 13β-ethyl-20ξ-hydroxy-6α-methyl - 18,19 - dinorpregn-4-en-3-one, a compound of Formula Ib wherein R is ethyl, X is C(H)OH and Y is H;

*Twelfth,* compounds of Formula Ic:

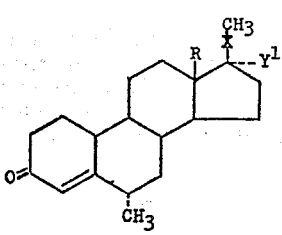

wherein R is alkyl of from about 2 to about 6 carbon atoms; X is C=O or C(H)OH; and Y¹ is OH or OCOR² wherein R² is (lower)alkyl; and

*Thirteenth,* 13β - ethyl - 17α-hydroxy-6α-methyl-18,19-dinorpregn - 4 - ene-3,20-dione, acetate, a compound of Formula Ic wherein R is ethyl, X is C=O and Y¹ is OCOCH₃.

The compounds of Formula I herein are valuable hormonally-active substances. They have been found to be active in standard pharmacological tests in laboratory animals such as mice, rats and rabbits and the like, progrestationally and anti-estrogenically. They are more active than many known compounds now used with these activities and, in addition, possess a valuable separation of hormonal properties to a greater degree than compounds presently used with these activities. Particularly valuable are compounds of the second, tenth and twelfth embodiments and especially valuable are compounds of the third through ninth, eleventh and thirteenth embodiments. Progestationally-active substances are used in cases of infertility and more specifically, but without limitation, to delay estrus and ovulation in cattle, pigs and dogs. Anti-estrogenically active compounds are administered to counter the effects due to an excess of estrogen, such as estrone and similar metrotropic agents. The instant compounds are also of value in that field of use known as microdose contraception. They have an anti-fertility effect at considerably lower levels of administration than the levels used conventionally, e.g., 1 mg. to 100 mg., on a daily basis.

The compounds of Formula I of this invention can be prepared by a general method comprising:

(a) Hydrogenating, as by exchange hydrogenation with a suitable organic hydrogen-donor, e.g., cyclohexene, in the presence of a catalyst, e.g., palladium on carbon, a 6-methylene compound of Formula II:

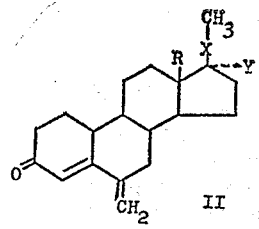

wherein R, X and Y are as hereinabove defined until formation of a compound of Formula Id:

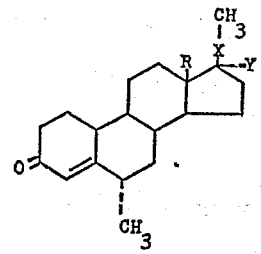

wherein R, X and Y are as hereinabove defined, is substantially complete and, recovering said compound;

(b) Rearranging, as by heating with a weak base, e.g., sodium acetate, and a noble metal catalyst, e.g., Pt or Pd/C, in an inert solvent, e.g., ethanol, a 6-methylene compound of Formula II hereinabove until formation of the corresponding compound of Formula Ie:

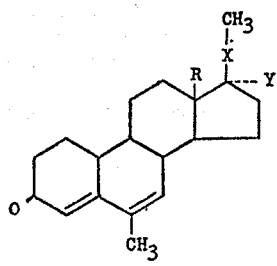

Ie wherein R, X and Y are as hereinabove defined, is substantially complete and, recovering said compound;

(c) Chlorinating or brominating, as with N-chlorosuccinimide or N-bromosuccinimide, an enol ester of Formula III:

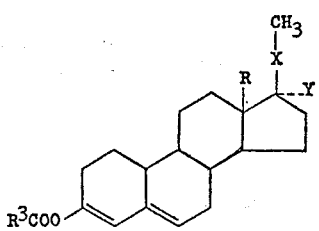

III wherein R, X and Y are as above defined and $R^3$ is (lower)alkyl, until formation of a compound of Formula If:

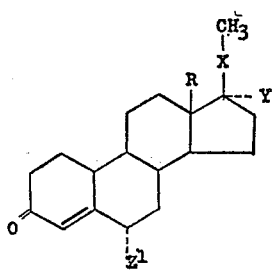

If wherein R, X, Y and $Z^1$ are as above defined is substantially complete, and recovering said compound;

(d) Either (1) directly dehydrogenating, as by heating with chloranil, a compound of Formula If until formation of a compound of Formula Ig:

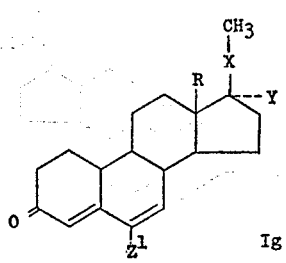

Ig wherein R, X, Y and $Z^1$ are as above defined, is substantially complete, and recovering said compound, or, preferably, (2) Reacting with dry hydrogen chloride, hydrogen bromide or hydrogen fluoride an epoxide of Formula IV:

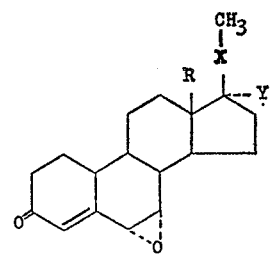

IV wherein R, X and Y are as hereinabove defined, until formation of a compound of Formula Ih:

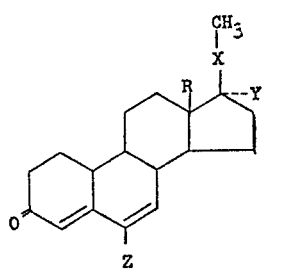

Ih wherein R, X, Y and Z are as above defined is substantially complete, and recovering said compound; or (e) Acylating a compound of Formula Ii:

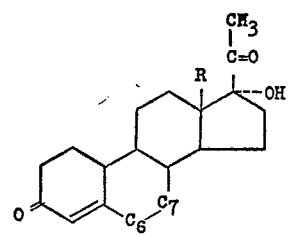

Ii wherein R and —$C_6$–$C_7$— are as defined in Formula I hereinabove, by treatment, first, with a reagent of the formulae $(R^2CO)_2O$ or $R^2COCl$ or, preferably, a mixture thereof in the presence of an acid binding agent, e.g., an organic base such as dimethylaniline, N-methylmorpholine or, preferably, pyridine, and, second, partially hydrolyzing, e.g. with 2% methanolic potassium hydroxide, the intermediate formed thereby to produce a compound of Formula Ij:

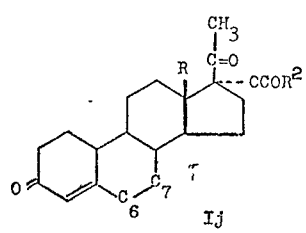

Ij wherein R, $R^2$ and —$C_6$–$C_7$— are as defined in Formula I hereinabove.

With respect to step (c) above, those skilled in the art will recognize that the 3-enol ether is a full equivalent of the 3-enol ester of Formula III for purposes of the conversion.

The method of step (a) i.e., hydrogenating a 6-methylene compound of Formula II can be carried out by an exchange hydrogenation technique. In this method, for example, a mixture of the 6-methylene compound with about 3 parts by weight of cyclohexene and about ⅓ part by weight of a catalyst, such as 5% palladium on carbon, is refluxed in absolute ethanol for about ½ to about 4 hours. The product of Formula Id is recovered by any standard technique. One useful method comprises adding ether, filtering the mixture, adding a trace of mineral acid and evaporating off the solvent to leave the product as a residue. It may, if desired be purified by recrystallization from ether.

The method of step (b), i.e., rearranging a 6-methylene compound of Formula II can be carried out by treating it with a weak base in the presence of a catalyst, such as palladium on carbon and in an inert solvent, preferably at moderately elevated temperatures, e.g., 75 to 100° C. In one manner of proceeding, the compound of Formula II is suspended in about 300 parts by weight of an alcohol, e.g., ethanol, and there is added about 0.5 part by weight of sodium acetate and about 0.15 part of 5% palladium on carbon. If the mixture is heated and refluxed for about 1 to 3 hours, rearrangement to the compound of Formula Ie is substantially complete. This can be recovered in any conventional way but a convenient means is to cool the mixture, dilute it with ether, filter it, wash with saturated aqueous sodium bicarbonate, then with brine, dry over anhydrous sodium sulfate and finally evaporate the solvents leaving the product as a residue. It may, if desired, be purified by recrystallization from ether.

A useful series of compounds outside the scope of this invention, namely, the 13-polycarbonalkyl-6α-methyl-18, 19-dinorpregn-4-ene-3,20-diones, can be prepared by treating the corresponding compounds of Formula Id wherein R is polycarbonalkyl, X is CH(OH) and Y is H with a standard oxidizing agent, e.g., the Jones reagent, 8 N chromic acid, until conversion to a corresponding compound wherein X is C=O is substantially complete, and recovering said compound, which has valuable progestational and anti-estrogenic properties.

Starting materials of Formula II hereinabove may be obtained according to one of the pathways outlined as follows:

In the first, a 13-alkyl-20-hydroxy-3-methoxy-18,19-dinorpregna-2,5(10)-diene (V) is subjected to a Vilsmeier reaction (POCl₃ in dimethylformamide) to obtain the corresponding 13-alkyl-6-formyl-20-hydroxy-3-methoxy-18,19-dinorpregna-3,5(6)-diene-20-formate (VI). Compound VI is hydrolyzed, as with potassium hydroxide in methanol, to the corresponding alcohol (VII) which, on treatment with sodium borohydride in methanol mixed with tetrahydrofuran, affords the 13-alkyl-20-hydroxy-6-hydroxymethyl-3-methoxy - 18,19 - dinorpregna-3,5(6)-diene (VIII). Treatment of compound VIII with dilute methanolic H₂SO₄ at about 25° C. results in hydrolysis of the enol ether and concomitant elimination of water to give the 13-alkyl-20-hydroxy-6-methylene - 18,19-dinorpregn-4-en-3-one of Formula IIa (R is as hereinabove defined and X is C(H)OH):

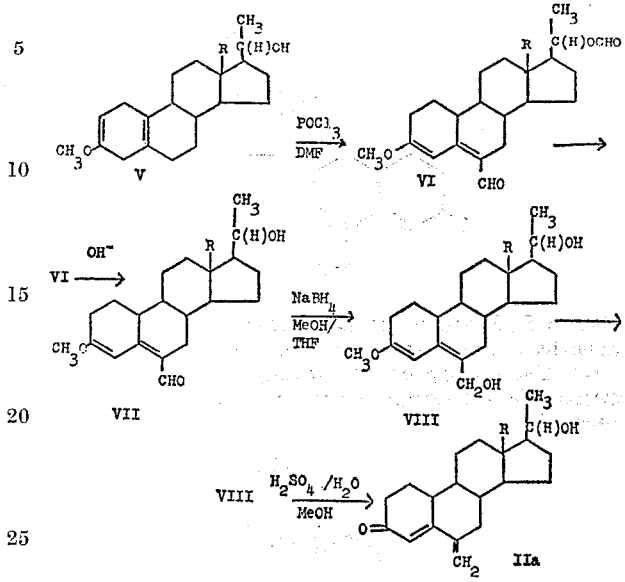

wherein "DMF" is dimethylformamide and "THF" is tetrahydrofuran.

In the second, the starting material, a 13β - alkyl-17α-hydroxy - 18,19 - dinorpregn-4-en-3,20-dione is treated with acetic anhydride and a trace of perchloric acid in ethyl acetate to obtain the corresponding 13β-alkyl-3,17-dihydroxy - 18,19 - dinorpregna - 3,5 - dien - 20 - one, diacetate, which is then reacted with methanolic potassium hydroxide in tetrahydrofuran to obtain the corresponding 13β - alkyl - 17 - hydroxy - 18,19 - dinorpregn-4-en-3,20-dione, acetate, which in turn is reacted with methyl orthoformate in dioxane containing p-toluenesulfonic acid to produce the corresponding 13β - alkyl-17 - hydroxy - 3 - methoxy - 18,19 - dinorpregna - 3,5-dien - 20 - one, acetate, which in turn is formylated with phosphorus oxychloride in dimethylformamide and ethylene dichloride to produce the corresponding 13β-alkyl - 6 - formyl - 17α - hydroxy - 3 - methoxy - 18,19-dinorpregna - 3,5 - dien - 20 - one, acetate, which is reduced with lithium aluminum tri-t-butoxyhydride in tetrahydrofuran to the corresponding 13β - alkyl - 17α - hydroxy - 6 - hydroxymethyl - 3 - methoxy - 18,19 - dinorpregna - 3,5 - dien - 20 - one, acetate; and treatment of this with oxalic acid in methanol and water produces the desired 13β - alkyl - 17α - hydroxy - 6 - methylene - 3-methoxy - 18,19 - dinorpregna - 4 - ene - 3,20 - dione, acetate according to the following sequence:

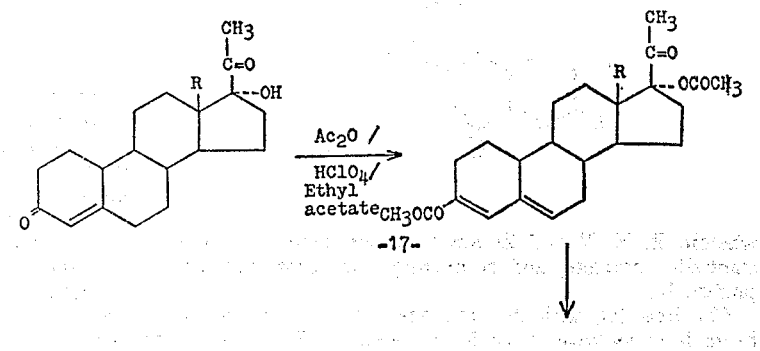

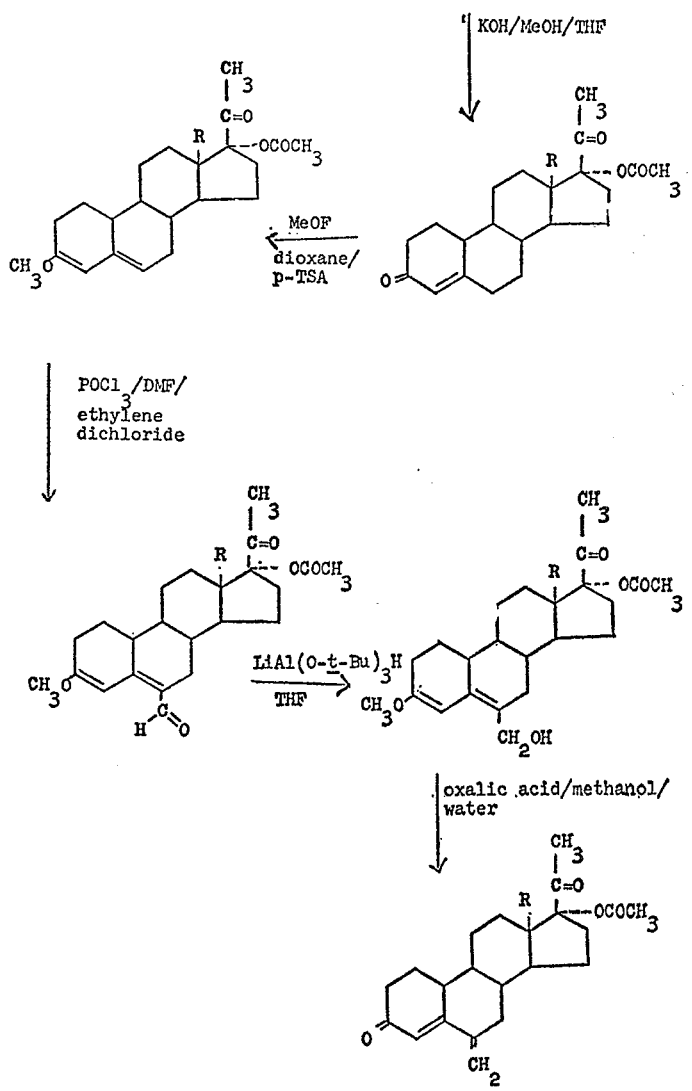

wherein R is as hereinabove defined, "THF" is tetrahydrofuran, "p-TSA" is p-toluenesulfonic acid and "MeOF" is methyl orthoformate.

The method of step (c), i.e., chlorinating an enol ester of Formula III with a reagent such as N-chlorosuccinimide or N-bromosuccinimide, can be carried out by adding the enol ester to about 30 parts of a (4:1) mixture of acetone, and water, which contains about 0.7 part of sodium acetate and 0.7 part of glacial acetic acid per part by weight of enol ester. The mixture then is cooled to about 5° C. and there is added about 6 to 8 parts of N-chlorosuccinimide per part by weight of enol ester. The formation of the product of Formula If is complete in about 1 to about 4 hours and it can be recovered by diluting the reaction mixture with water, then extracting with ether and evaporating to dryness leaving compound If as a residue. If, instead of N-chlorosuccinimide, N-bromosuccinimide is used, there is obtained the corresponding 6-bromo compound of Formula If.

Starting materials of Formula III hereinabove may be prepared starting with an enol ether of Formula Vb:

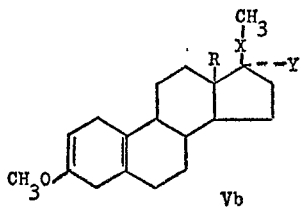

wherein R, X and Y are as above defined, by acid hydrolysis e.g., with methanol: concentrated HCl: water 90:6:4, or of the corresponding cyclic 20-ethylene ketal, acylating with an acid anhydride, preferably acetic anhydride in the presence of a trace of perchloric acid and about 40 parts by volume of ethyl acetate. The reaction is quite rapid, being substantially complete in about 15–20 minutes. Treatment with enough aqueous sodium bicarbonate to destroy excess acetic anhydride and evaporation of the organic layer to dryness, provides Compound III as a residue.

The method of step (d)(1), i.e., dehydrogenation of a compound of Formula If to introduce a double bond between $C_6$ and $C_7$ is carried out with a reagent such as chloranil. In one manner of proceeding, compound If can be suspended in 25 parts by volume of a solvent, such as ethyl acetate, containing about 5 parts by volume of acetic acid and about 2 parts by weight of chloranil per part by weight of If is added. If the mixture is refluxed under nitrogen for about 24 hours, conversion to compound Ig is substantially complete and it may be recovered, for example, by cooling the mixture, washing it with 10% sodium hydroxide solution, then with brine, drying it over anhydrous sodium sulfate and, finally, evaporating to dryness, leaving Ig as a residue.

The method of step (d)(2), i.e., preparation of the halo-4,6-diene of Formula Ih can be carried out with dry hydrohalic acids. In one manner of proceeding, the epoxide (IV) can be suspended in about 50 parts by volume of glacial acetic acid. The mixture is cooled to about the freezing point of glacial acetic acid, 16.6° C., and a slow stream of gaseous hydrogen chloride, hydrogen bromide or hydrogen iodide is passed through. After about 2 to 6 hours, the formation of the compound of Formula Ih is substantially complete and the product can, for example, be recovered by pouring the mixture into ice water and extracting with a witer-immiscible solvent, such as a mixture of 10:1 benzene and ether. The organic layer is washed free of acid, e.g. with dilute sodium bicarbonate, dried and evaporated to leave compound Ih as a residue.

Starting materials of Formula IV hereinabove, the epoxides may be prepared by halogen elimination in the 6-chloro or -bromo compound of Formula If, to provide the 4,6-diene (IX) followed by epoxidation thereof to provide compound IV according to the following:

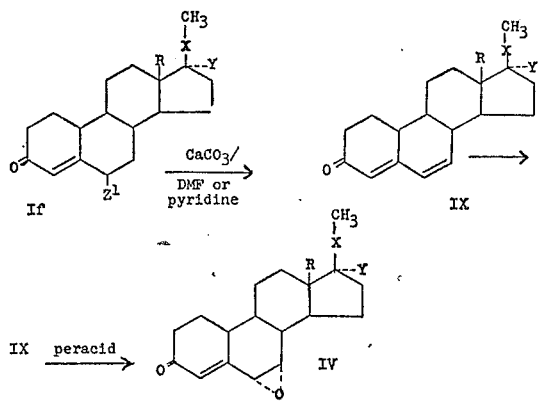

wherein R, X, Y and $Z^1$ are as hereinabove defined and "DMF" is dimethylformamide. The dehalogenation is accomplished, for example, by suspending compound If in about 50 parts by volume of dimethylformamide or pyridine and adding about 3 parts by weight of calcium carbonate based on parts by weight of If. Refluxing under nitrogen for about 1 hour, filtering off the solid, pouring the filtrate into water, extracting with ether and evaporation of the ether leaves the 4,6-diene IX as a residue. This is epoxidized, for example by suspending it in about 50 parts by volume of chlorofrom and treating the mixture with 1 part by weight of a peracid, such as perbenzoic and or preferably monoperphthalic acid, per part by weight of IX, for about 48 hours at about 22° C. The epoxide IV is then recovered, for example, by washing the organic phase with saturated sodium bicarbonate, then with brine, drying it over sodium sulfate and evaporating the solvent to leave IV as a residue.

The method of step (e), i.e., acylating then selectively hydrolyzing a compound of Formula Ii, is carried out stepwise, first with an appropriate acyl anhydride, e.g., acetic anhydride, or an acyl halide, e.g., acetyl chloride or acetyl bromide, or, preferably mixtures thereof, in the presence of an acid binding agent, such as an organic base, preferably pyridine, to form the corresponding enol ester, 17α-acylate. In one manner of proceeding, compound Ii is treated with an excess of acetic anhydride and acetyl chloride in pyridine and the mixture is warmed to about 50–75° C. for a few minutes then kept at about 23° C. for about 67 hours. The enol ester is recovered by pouring the mixture into a large volume of water and extracting the organic layer with ether; washing, drying and evaporating the ether leaves the enol ester as a residue. This is selectively hydrolyzed with a dilute base. In one manner of proceeding, the enol acetate is suspended in 2% methanolic potassium hydroxide and the mixture is stirred at 0° C. until partial hydrolysis is substantially complete. Cooling and neutralizing the reaction mixture, evaporating to dryness, extracting the residue with ether and evaporating the ether, leaves compound Ij as a residue.

Starting materials for all of the above-mentioned compounds can be made by processes described for analogs in the copending application of R. P. Stein, R. C. Smith and H. Smith, filed on July 30, 1968, Ser. No. 748,594 now abandoned. They are also shown in U.K. Pat. 1,115,-635, May 29, 1968. They may be made by applying, in earlier steps, methods of total synthesis described by Douglas, Graves, Tartley, Hughes, McLoughlin, Siddall and Smith in J. Chem. Soc., 1963, 5072–5094; and by H. Smith, Hughes, Douglas, Wendt, Buzby, Jr., Edgren, Fisher, Foell, Gadsby, Hartley, Herbst, Jansen, Ledig, McLoughlin; McMenanim, Pattison, Phillips, Rees, Siddall, Suida, L. Smith, Tokolics and Watson in J. Chem. Soc., 1964, 4472–4492. In the product of a total synthesis which has not included a suitable resolution stage the compounds of the invention will be present as racemates. Using a convention approved by Fieser and Fieser, "Steroids," p. 336 (1956), the compounds designated as the d-forms are the enantiomers corresponding in configuration at C–13 to that of the natural hormone estrone. The corresponding enantiomorphs are consequently designated the l-forms and the racemates the dl-forms. Racemates will be depicted by structural formulas which show only the enantiomorphs of the d-configuration.

The time and temperature ranges used in carrying out the above mentioned processes are not particularly critical and, as will be readily apparent to those skilled in the art, will be selected to carry out the reaction in a minimum of time without undue difficulty. Thus, reaction temperatures below those exemplified can be used, but then the reaction time is extended. On the other hand, reaction temperatures higher than those exemplified can be used with a concomitant decrease in reaction time, although purity of the product may be somewhat decreased.

As is mentioned hereinabove, the compounds of Formula I have progestational and anti-estrogenic activity, and they are also useful to prepare compounds with these activities. The progestational activity is illustrated by standard pharmacological tests in warm-blooded lower animals. In one such test, the Clauberg assay, immature female rabbits are primed with estradiol-17β for six days. The primed rabbits then receive graded doses of the compound daily for five days before autopsy on the sixth. Progestational activity is assessed by histological evaluation of uterine glandular proliferation according to Elton and Edgren, Endocrinology, 63, 464–472 (1958). The anti-estrogenic activity also is illustrated by standard pharmacological tests in warm-blooded lower animals. In one such test, the estrogen antagonist-mouse uterine growth assay, 100 μg., of estriol is administered simultaneously with graded doses of the test compound over three days. At autopsy on day four, the uteri are removed and weighed. Active materials inhibit the metrotropic effect of estriol, as illustrated by Edgren and Calhoun, Experientia, 16, 188 (1960).

The products of Formula I of this invention can be used for the above pharmacological purposes in association with a non-toxic carrier. They can be formulated in liquid or solid forms, for instance as capsules, tablets, suppositories, powders, dispersible granules, cachets, and the like by combining them with conventional carriers. Such conventional carriers include magnesium carbonate or stearate, talc, sugar, lactose, pectin, dextrin, starch, gelatin, tragacanth, methyl cellulose, sodium carboxymethyl cellulose, low melting wax and cocoa butter. Diluents, flavoring agents, solubilizers, lubricants, suspending agents, binders or tablet-disintegrating agents can be used. Powders or tablets preferably contain 5 or 10 to 99% of the active constituent. The active steroid can be formulated with an encapsulating material with or without other carriers.

Liquid preparations such as solutions, suspensions or emulsions can also be used. Such preparations include dispersions in a non-toxic carrier such as arachis oil or sterile water, preferably containing a nonionic surface active agent such as fatty acid esters of polyhydroxy compounds, e.g., sorbitan, aqueous starch in sodium carboxymethyl cellulose solutions, aqueous propylene glycol or polyethylene glycol. Thus a water-propylene glycol solution can be used for parenteral injection and aqueous suspensions suitable for oral use can be made by utilizing natural or synthetic gums, resins, methyl cellulose or other well known suspending agents.

The composition can be administered to the warm-blooded lower animal in unit dose form in which the dose unit is for instance from about 0.1 to about 200 mg. of each active steroid. The unit dose form can be a packaged composition, e.g., packeted powder, vials, or ampules or, for example, in the form of capsules, cachets or tablets or any number of those in packaged form. The compositions can also consist substantially solely of the active steroid when this is in unit dose form. When used for the purposes stated above, the dosage of the compounds will vary with the conditions being treated, but in general will be in the range established for progesterone (Merck Index, seventh edition, p. 856 (1960)).

DESCRIPTION OF THE PREFERRED EMBODIMENTS

The following examples are given by way of illustration and are not to be construed as limitations of this invention, variations of which are possible without departing from the scope and spirit thereof.

EXAMPLE 1

13β-Ethyl-20ξ-hydroxy-6α-methyl-18,19-dinorpregn-4-en-3-one (a) $dl$-13β - ethyl-6-formyl-3-methoxy-18,19-dinorpregna-3,5-dien-20ξ-ol, formate.—To a solution of distilled dimethylformamide (0.65 g.) in distilled ethylene dichloride (1.0 ml.) at 0° C. is added a solution of distilled phosphorus oxychloride (0.69 g.) in ethylene dichloride (3.0 ml.) over 30 minutes. After stirring an additional 10 minutes at 0° C., pyridine (1 drop) is added and then a solution of $dl$-13β-ethyl-3-methoxy-18,19-dinorpregna-2,5(10)-dien-20ξ-ol (0.66 g.) in ethylene dichloride (10 ml.) containing pyridine (100 mg.) is added all at once. After stirring the red solution at 0° C. for 1 hour a solution of sodium acetate (4.0 g.) in water (40 ml.) is added and the mixture is stirred vigorously for 10 minutes. The mixture is poured into water, extracted with ether, the organic layer washed with water until the washings are colorless, dried over anhydrous sodium sulfate and stripped in vacuo. Trituration of the residue with methanol affords 0.34 g. of yellow-colored product; M.P. 175–182° C., (softening from 170° C.);

$\lambda_{max.}^{KBr}$ 5.84, 6.07, 6.24μ; $\lambda_{max.}^{EtOH}$ 220 mμ (ε 7,700), 321 mμ (ε 14,800)

(b) $dl$-13β - ethyl-6-formyl-3-methoxy-18,19-dinorpregna - 3,5 - dien-20ξ-ol.—To a solution of $dl$-13β-ethyl-6-formyl - 3 - methoxy - 18,19 - dinorpregna-3,5-dien-20ξ-ol, formate (2.65 g.) in tetrahydrofuran (100 ml.) under nitrogen at about 23° C. is added all at once a solution of potassium hydroxide (1.35 g.) in methanol (100 ml.). Stirring at room temperature is continued for 30 minutes, the mixture is poured into saturated aqueous sodium bicarbonate and extracted with benzene. The benzene extracts are washed with water, dried over anhydrous sodium sulfate and stripped in vacuo. Trituration of the residue with ether affords 1.41 g. of yellow colored product; M.P., 185–191° C.;

$\lambda_{max.}^{KBr}$ 3.03, 6.07, 6.24μ; $\lambda_{max.}^{EtOH}$ 220 mμ (ε 9,400), 322 mμ (ε 15,400)

(c) $dl$ - 13β - ethyl-6-hydroxymethyl-3-methoxy-18,19-dinorpregna-3,5-dien-20ξ-ol.—To a solution of $dl$-13β-ethyl - 6 - formyl - 3-methoxy-18,19-dinorpregna-3,5-dien-20ξ-ol (1.0 g.) in methanol (20 ml.) and tetrahydrofuran (20 ml.) at room temperature is added sodium borohydride (250 mg.) all at once. The mixture is stirred at about 23° C. for 15 minutes, poured into water and extracted with benzene. The organic layer is washed with water, brine, dried over anhydrous sodium sulfate and stripped in vacuo. Trituration of the residue with ether affords 0.45 g. of colorless product; M.P., 128–133° C.;

$\lambda_{max.}^{KBr}$ 3.04, 6.11, 6.21μ; $\lambda_{max.}^{EtOH}$ 250 mμ (ε 17,800)

(d) $dl$ - 13β - ethyl - 20ξ - hydroxy - 6-methylene-18,19-dinorpregn-4-en-3-one.—To a stirred slurry of $dl$-13β-ethyl - 6 - hydroxymethyl - 3-methoxy-18,19-dinorpregna-3,5-dien-20ξ-ol (100 mg.) in methanol (1.0 ml.) at room temperature is added a trace of 8 N sulfuric acid. Solution occurs immediately on adding the acid, and reprecipitation occurs after 2 minutes. After 5 minutes the precipitate is filtered giving 40 mg. of colorless product; M.P. 160–165° C. and 215–222° C.;

$\lambda_{max.}^{KBr}$ 2.96, 6.04, 6.18, 6.30μ; $\lambda_{max.}^{EtOH}$ 265 mμ (ε 11,300)

(e) $dl$ - 13β - ethyl-20ξ-hydroxy-6α-methyl-18,19-dinorpregn - 4 - en - 3-one.—A mixture of $dl$-13β-ethyl-20ξ-hydroxy - 6 - methylene - 18,19-dinorpregn-4-en-3-one (650 mg.), cyclohexene (1.95 ml.) and Pd/C (5%, 130 mg.) in absolute ethanol (32.5 ml.) is heated at reflux for 45 minutes. The mixture is diluted with ether and filtered through filter-aid. A trace of concentrated hydrochloric acid is added and the solution is stripped in vacuo. Recrystallization of the solid residue from ether affords 0.605 g. of colorless product; M.P., 162–168° C.;

$\lambda_{max.}^{KBr}$ 2.94, 6.05, 6.23μ; $\lambda_{max.}^{EtOH}$ 241 mμ (ε 14,800)

NMR has 4 H at 5.85 p.p.m. 17 H at 3.78 p.p.m. (triplet), 6α CH₃ at 1.18 p.p.m. (doublet, J 2 c.p.s.) and 21 CH₃ at 1.07 p.p.m. (doublet, J 2 c.p.s.).

Analysis.—Calcd. for $C_{22}H_{34}O_2$ (percent): C, 79.95; H, 10.37. Found (percent): C, 79.58; H, 10.24.

EXAMPLE 2

13β-ethyl-6α-methyl-18,19-dinorpregn-4-ene-3,20-dione

To a solution of $dl$-13β-ethyl-20ξ-hydroxy-6α-methyl-18,19-dinorpregn-4-ene-3-one (600 mg.) in acetone (30 ml.) at 0° C. is added dropwise over 5 minutes Jones reagent (8 N chromic acid, 0.05 ml.). Stirring at 0° C. is continued for 10 more minutes and excess isopropanol is added. The mixture is diluted with ether, filtered through filter-aid, washed with saturated aqueous sodium bicarbonate, brine, dried over anhydrous sodium sulfate and stripped in vacuo. The solid residue is recrystallized from ether giving 0.37 g. of off-white colored product, M.P. 143–146° C.;

$\lambda_{max.}^{KBr}$ 5.90, 6.00, 6.24μ; $\lambda_{max.}^{EtOH}$ 241 mμ (ε 15,900)

NMR has 4 H at 1.09 p.p.m. (doublet, J=p c.p.s.).

Analysis.—Calcd. for $C_{22}H_{32}O_2$ (percent): C, 80.44; H, 9.53. Found (percent): C, 80.61; H, 9.33.

EXAMPLE 3

13β-ethyl-20ξ-hydroxy-6-methyl-18,19-dinorpregn-4,6-dien-3-one

A mixture of $dl$-13β-ethyl-20ξ-hydroxy-6-methylene-18,19-dinorpregn-4-en-3-one (100 mg.), sodium acetate (50 mg.) and Pd/C (5% 15 mg.) in absolute ethanol (30 ml.) is heated at reflux for 1½ hours. The mixture is cooled to about 23° C. diluted with ether, filtered through filter-aid, washed with saturated aqueous sodium bicarbonate, brine, dried over anhydrous sodium sulfate and stripped in vacuo. The solid residue is recrystallized from ether giving 22 mg. of colorless product; M.P. 204–205° C.;

$\lambda_{max.}^{KBr}$ 2.91, 6.05, 6.18, 6.31μ; $\lambda_{max.}^{EtOH}$ 290 mμ (ε 22,800)

NMR has vinyl protons at 5.93 p.p.m. and 6.03 p.p.m., 17 H at 3.75 p.p.m., 6 CH₃ at 1.80 p.p.m. and 21 CH₃ at 1.12 p.p.m. (doublet, J 5.5 c.p.s.).

EXAMPLE 4

13β-ethyl-17α-hydroxy-6α-methyl-18,19-dinorpregn-4-en-3,20-dione, acetate (a) $dl$ - 13β-ethyl-3,17-dihydroxy-18,19-dinorpregn-3,5-dien-20-one, diacetate.—A solution of $dl$-13β-ethyl-17-hydroxy-18,19-dinorpregn-4-ene-3,20-dione (1.10 g.) in ethyl acetate (10 ml.) containing acetic anhydride (1.2 ml.) and perchloric acid (0.011 ml.) is stirred at room temperature for 5 minutes. The resulting yellow solution is diluted with ether, washed with saturated aqueous sodium bicarbonate, brine, dried over anhydrous sodium sulfate and stripped in vacuo. Crystallization of the gummy residue from methanol gives 1.03 g. of colorless product; M.P. 182–191° C.;

$\lambda_{max.}^{KBr}$ 5.71, 5.80, 5.89, 6.01 and no hydroxyl absorption; $\lambda_{max.}^{EtOH}$ 234 m$\mu$ ($\epsilon$ 17,600)

NMR has vinyl protons at 5.47 p.p.m. and 5.76 p.p.m., two acetate methyls at 2.11 p.p.m. and $C_{21}$ methyl at 2.09 p.p.m.

(b) $dl$ - 13$\beta$-ethyl-17$\alpha$-hydroxy-18,19-dinorpregn-4-en-3,20-dione, acetate.—To a solution of $dl$-13$\beta$-ethyl-3,17-dihydroxy-18,19-dinor - pregna-3,5-dien-20-one, diacetate (5.40 g.) in tetrahydrofuran (108 ml.) and methanol (108 ml.) is added under nitrogen at 0° C. a 2% solution of potassium hydroxide in methanol (108 ml.). Stirring at 0° C. is continued for 25 minutes. The mixture is poured into saturated aqueous sodium bicarbonate extracted with ether, and the organic layer washed with water, brine, dried over anhydrous sodium sulfate and stripped in vacuo, giving a colorless solid. Recrystallization from ethyl acetate/hexane gives 4.22 g. of colorless product, M.P. 192–194° C.;

$\lambda_{max.}^{KBr}$ 5.80, 5.84, 6.01, 6.22

(c) $dl$ - 13$\beta$-ethyl-17$\alpha$-hydroxy-3-methoxy-18,19-dinorpregna-3,5-dien-20-one, acetate.—To a suspension of $dl$-13$\beta$ - ethyl-17-hydroxy-18,19-dinorpregn-4-ene-3,20-dione, acetate (3.0 g.) in dioxane (15.9 ml.) at room temperature is added methyl orthoformate (4.0 ml.) and a solution containing p-toluenesulfonic acid (0.16 g.) and methanol (0.36 ml.) in dioxane (1.75 ml.). The steroid dissolves after stirring 5 minutes and stirring is continued for another 55 minutes. Pyridine (8.5 ml.) is added and the mixture diluted with ether. Washing with water, brine, drying over anhydrous sodium sulfate and stripping in vacuo gives a gum. Crystallization from methanol containing a trace of pyridine gives 1.81 g. of colorless product; M.P. 153–166° C.;

$\lambda_{max.}^{KBr}$ 5.79, 5.83 (shoulder), 6.06, 6.15

(d) $dl$-13$\beta$-ethyl-6-formyl - 17$\alpha$ - hydroxy-3-methoxy-18,19-dinorpregna-3,5-dien-20-one, acetate.—To a solution of distilled dimethylformamide (7.25 ml.) and distilled ethylene dichloride (3.0 ml.) at 0° C. is added a solution of distilled phosphorus oxychloride (1.50 g.) in ethylene dichloride (9.0 ml.) over 30 minutes. After stirring an additional 10 minutes at 0° C., pyridine (1 drop) is added and a solution of $dl$-13$\beta$-ethyl-17$\alpha$-hydroxy-3-methoxy - 18,19 - dinorpregna - 3,5 - dien-20-one, acetate. (1.70 g.) in ethylene dichloride (27 ml.) containing pyridine (15 drops) is added all at once. After stirring the red solution at 0° C. for 1 hour a solution of sodium acetate (12.0 g.) in water (125 ml.) is added and the mixture stirred vigorously for 10 minutes. The mixture is extracted with ethyl acetate. The organic layer is washed with saturated aqueous sodium bicarbonate, water until the washings are colorless, dried over anhydrous sodium sulfate and stripped in vacuo. Trituration of the resulting gum with ether/hexane gives 1.29 g. of yellow colored product; M.P. 182–187° C.;

$\lambda_{max.}^{KBr}$ 5.78, 5.83, 6.02, 6.19 (very strong), 6.28 (shoulder), 6.40 (shoulder); $\lambda_{max.}^{EtOH}$ 220 m$\mu$ ($\epsilon$ 9,400), 322 m$\mu$ ($\epsilon$ 15,800)

(e) $dl$ - 13$\beta$ - ethyl - 17$\alpha$ - hydroxy - 6 - hydroxymethyl - 3 - methoxy - 18,19-dinorpregna - 3,5 - dien-20-one - acetate.—To a solution of $dl$ - 13$\beta$ - ethyl - 6-formyl - 17 - hydroxy - 3 - methoxy - 18,19-dinorpregna-3,5 - dien - 20 - one, acetate (1.0 g.) in tetrahydrofuran (20 ml.) under nitrogen at room temperature is added a solution of lithium tri-t-butoxyaluminum hydride (1.24 g.) in tetrahydrofuran (20 ml.). The mixture is stirred for 20 minutes at room temperature and poured into ice water. Dilution with ether, washing the organic layer with saturated aqueous sodium bicarbonate, brine, drying over anhydrous sodium sulfate and stripping in vacuo gives a gum. Crystallization from ether/hexane affords 0.78 g. of product; M.P. 157–162° C.;

$\lambda_{max.}^{KBr}$ 2.90, 5.80, 5.88, 6.12 and 6.22$\mu$; $\lambda_{max.}^{EtOH}$ 248 m$\mu$ ($\epsilon$ 18,700)

(f) $dl$ - 13$\beta$ - ethyl - 17$\alpha$ - hydroxy - 6 - methylene-18,19 - dinorpregn - 4 - ene - 3,20 - dione, acetate.—To a solution of $dl$ - 13$\beta$ - ethyl - 17 - hydroxy - 6 - hydroxymethyl - 3 - methoxy - 18,19 - dinorpregna - 3,5 - dien-20-one, acetate (0.73 g.) and oxalic acid dihydrate (0.73 g.) in methanol (73 ml.) is added water (30 ml.) at room temperature. After 5 minutes a precipitate begins to form. After 45 minutes at room temperature the mixture is poured into saturated aqueous sodium bicarbonate, extracted with ether, the extract washed with brine, dried over anhydrous sodium sulfate and stripped in vacuo. The residue is triturated with ether/hexane giving 0.53 g. of product; M.P. 226–252° C. (turns brown);

$\lambda_{max.}^{KBr}$ 5.80, 5.88, 6.00, 6.19, 6.29, 10.93$\mu$; $\lambda_{max.}^{EtOH}$ 266 m$\mu$ ($\epsilon$ 10,900)

(g) 13$\beta$ - ethyl - 17$\alpha$ - hydroxy - 6$\alpha$ - methyl - 18,19-dinorpregn - 4 - ene-3,20-dione, acetate.—A mixture of $dl$ - 13 - ethyl - 17$\alpha$ - hydroxy - 6 - methylene - 18,19-dinorpregn-4-ene-3,20 - dione, acetate (0.50 g.), Pd/C (5%, 0.10 g.), cyclohexene (1.50 ml.) and benzyl alcohol (1 drop) in absolute ethanol (25.0 ml.) is heated at reflux for 15 minutes after which time a sample shows UV absorption at 242 m$\mu$ and no 266 m$\mu$ absorption. The mixture is cooled to room temperature, filtered through filter aid and stripped in vacuo. The resulting gum is dissolved in 12 ml. of a mixture of concentrated hydrochloric acid (4.0 ml.), methanol (90.0 ml.) and water (14.0 ml.) and stirred at room temperature under nitrogen for 15 minutes. The solution is poured into saturated aqueous sodium bicarbonate. Extraction with ether, washing with brine and drying over anhydrous sodium sulfate and stirpping in vacuo gives a gum which does not crystallize well. Column chromatography on Grade III Woelm neutral alumina using 100% benzene as eluant gives 0.21 g. of colorless product on crystallization from ether/hexane; M.P. 160–163° C.;

$\lambda_{max.}^{KBr}$ 5.80, 5.84 (shoulder), 6.01, 6.22$\mu$; $\lambda_{max.}^{EtOH}$ 240 m$\mu$ ($\epsilon$ 16,700)

one major and one faint trace spot on TLC; GLC shows 2 major and 2 minor peaks (63%, 31%, 4% and 2%). NMR has 4 H at 5.84 p.p.m., and methyl peaks at 2.07 (singlet), 2.11 (singlet), and 1.13 (doublet, J 6.0 c.p.s.).

*Analysis.*—Calcd. for $C_{24}H_{34}O_4$ (percent): C, 74.57; H, 8.87. Found (percent): C, 74.27; H, 8.65.

EXAMPLE 5

13$\beta$-ethyl-17$\alpha$-hydroxy-6-methyl-18,19-dinorpregna-4,6-diene-3,20-dione Following the procedure for Example 3, 13$\beta$-ethyl-17$\alpha$-hydroxy - 6 - methylene - 18,19 - dinorpregn - 4 - en-3,20-dione is converted to the title compound.

EXAMPLE 6

13$\beta$-ethyl-6$\alpha$-chloro - 18,19 - dinorpregn-4-en-3-on-20-ol, acetate and 13$\beta$-ethyl-6$\alpha$-bromo-18,19-dinorpregn-4-en-3-on-20-ol, acetate (a) 13$\beta$-ethyl-18,19-dinorpregna-3,5(6) - diene - 3,20-diol - 3,20 - diacetate.—13$\beta$ - ethyl - 3 - methoxy-18,19-dinorpregna - 2,5(10) - dien - 20 - ol is hydrolyzed in a mixture of methanol: concentrated HCl:water, 90:6:4 respectively (50 ml.) for one hour with stirring. The product is filtered off directly and washed with water. After drying, the crude 13β - ethyl - 18,19-dinorpregn-4-en-3-one-20-ol (0.75 g.) has M.P., 170–175° C., $$\lambda_{max.}^{EtOH} \ 242 \ (\epsilon \ 14,400)$$

IR shows 6.01μ and 6.19μ.

This material is suspended in a mixture of acetic anhydride (4.8 ml.), ethyl acetate (45 ml.) and 70% perchloric acid (0.01 ml.) and stirred for 15–20 minutes. The excess acetic anhydride is destroyed by shaking with saturated sodium bicarbonate solution and the organic layer evaporated giving the title product.

(b) 13β - ethyl - 6α - chloro - 18,19 - dinorpregn-4-en - 3 - on - 20 - ol, acetate.—13 - ethyl - 18,19 - dinorpregna - 3,5(6) - dien - 3,20 - diol, 3,20 - diacetate (1 g.) is added to a mixture of acetone (23 ml.), water (6 ml.), sodium acetate (0.7 g.) and acetic acid (0.7 ml.). The mixture is cooled to 5° C., then treated with 8.3 g. of N-chlorosuccinimide. After 1¼ hours water is added and the product extracted with ether. The organic layer is evaporated and the product is obtained as a residue.

(c) 13β - ethyl-6α-bromo-18,19-dinorpregn-4-en-3-on-20-ol, acetate.—The procedure of step (b) is repeated substituting N-bromosuccinimide for the chloro compound and the named product is obtained.

EXAMPLE 7

13β-ethyl-6-chloro-18,19-dinorpregna-4,6-dien-3-on-20-ol, acetate and 20-alcohol (a) 13β-ethyl-18,19 - dinorpregna - 4,6 - dien - 3 - on-20-ol, acetate.—The product of Example 6, step (c) is refluxed in dimethylformamide (50 ml.) with 3 g. of calcium carbonate for 1 hour under nitrogen. The solid is filtered off and the filtrate poured into water and extracted with ether. Evaporation of the solvent gives the title compound.

(b) 13β - ethyl-18,19-dinor-6α,7α-oxidopregn-4-en-3-on-20-ol. acetate.—13β - ethyl - 18,19-dinorpregna-4,6-dien-3-on-20-ol, acetate (1 g.) in chloroform (50 ml.) is treated with monoperphthalic acid (24 ml. of 0.67 M) for 48 hours at room temperature. The organic phase is washed with saturated sodium bicarbonate then brine, and dried over sodium sulfate. Evaporation of the solvent gives the title compound.

(c) 13β - ethyl - 6-chloro-18,19-dinorpregna-4,6-dien-3-on-20-ol, acetate, and 20 - alcohol.—13β-ethyl-18,19-dinor-6α,7α - oxidopregn-4-en-3-on-20-ol, acetate (1 g.), is suspended in glacial acetic acid (50 ml.). A slow stream of dry hydrogen chlorine is passed through the mixture at a temperature close to the freezing point of acetic acid (16.6° C.). After 2–6 hours, the mixture is pored into ice water and extracted with benzene ether (10:1). The organic layer is washed free from acid, then dried and evaporated to give the title compound. Treatment of this material with 2% methanolic potassium hydroxide yields the corresponding alcohol at C–20.

An alternative procedure for preparation of the title compound is to take the 13β-ethyl-6α-chloro-18,19-dinorpregn-4-en-3-one-20-ol, acetate of Example 6, step (b) (1 g.) in ethyl acetate (25 ml.), acetic acid (5 ml.) and reflux with chloranil (2 g.) for 24 hours under nitrogen. The mixture is cooled, washed with sodium hydroxide solution (10%) then brine, and dried. Evaporation gives 13β - ethyl-6-chloro-18,19-dinorpregna-4,6-dien-3-on-20-ol, acetate.

The procedure of this example step (c) is repeated, substituting dry hydrogen bromide and hydrogen fluoride, respectively, for hydrogen chloride. There are obtained 13β - ethyl-6-bromo-18,19-dinorpregna-4,6-dien-3-on-20-ol, acetate and 20-alcohol; and 13β-ethyl-6-fluoro-18,19-dinorpregna-4,6-dien-3-on-20-ol, acetate and 20-alcohol.

EXAMPLE 8

13β-ethyl-6α-chloro-18,19-dinorpregn-4-ene-3,20-dione-17α-ol, acetate (a) 13β - ethyl-18,19-dinorpregna-3.5(6)-dien-20-one-3,17α-diol, diacetate.—Using the same conditions as for Example 6, step (a), 13β - ethyl-3-methoxy-18,19-dinorpregna-2,5(10)-dien-20-on-17α-ol is converted to the title compound.

(b) 13β - ethyl-6α-chloro-18,19-dinorpregn-4-en-3,20-dion-17α-ol, acetate.—Using the same conditions as for Example 6, step (b), 13β - ethyl-18,19-dinorpregna-3,5(6)-dien-20-one-3,17α-diol, diacetate, is converted to the product.

EXAMPLE 9

13β-ethyl-6-chloro-18,19-dinorpregna-4,6-dien-3,20-dion-17α-ol, acetate, and 17α-alcohol (a) 13β - ethyl-18,19-dinorpregna-4,6-diene-3,20-dion-17α-ol, acetate.—The product of Example 8, step (b) is heated with dimethylformamide and calcium carbonate according to the procedure of Example 7, step (a) and the named compound is obtained.

(b) 13β - ethyl-18,19-dinor-6α,7α-oxidopregn-4-en-3-20-dion-17α-ol, acetate.—Using the same conditions as for Example 7, step (b), 13β - ethyl-18,19-dinorpregna-4,6 - dien-3,20-dione-17α-ol, acetate, is converted to the title compound.

(c) 13β - ethyl-6-chloro-18,19-dinorpregna-4,6-dien-3,20-dion-17α-ol, acetate and 17α-alcohol.—Using the same conditions as for Example 7, step (c) 13β - ethyl-18,19-dinor - 6α,7α-oxidopregna-4-en-3,20-dione-17α-ol, acetate is converted to the title compound.

Alternatively, using the conditions of the second method in Example 7, step (c.), 13β - ethyl-6ξ-chloro-18,19-dinorpregn-4-en-3,20-dione-17α-ol, acetate is converted to the title compound.

The 17-acetate group in the compound of this example is hydrolyzed with 2% methanolic potassium hydroxide according to Example 7 and the 17α-alcohol is obtained.

Similarly, following the procedure of Example 7, the corresponding 13β-ethyl-6-bromo-18,19-dinorpregna-4,6-dien-3,20-dion-17α-ol, acetate and 17 - alcohol and 13β-ethyl-6 - fluoro - 18,19 - dinorpregna-4,6-dien-3,20-dion-17α-ol, acetate and 17-alcohol are prepared.

EXAMPLE 10

The procedure of Example 1, step (e) is repeated, substituting for the 13α-ethyl-20ξ-hydroxy-6-methylene-18,19-dinorpregna-4-en-3-one, stoichiometrical amounts of the following compounds:

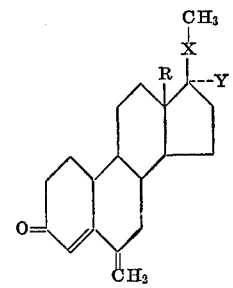

| R | X | Y |
|---|---|---|
| CH₂CH₂CH₃ | C(H)OH | H |
| CH₂(CH₂)₄CH₃ | C(H)OH | H |
| CH(CH₃)₂ | C(H)OH | H |
| CH₂CH₃ | C(H)OH | OCOCH₃ |
| CH₂CH₃ | C=O | OH |
| CH₂CH₃ | C=O | OCOCH₃ |
| CH₂CH₃ | C=O | OCOCH₂(CH₂)₄CH₃ |
| CH₂CH₃ | C(H)OCOCH₃ | H |

There are obtained the following compounds:

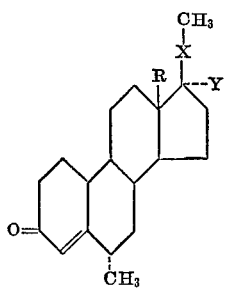

| R | X | Y |
|---|---|---|
| CH₂CH₂CH₃ | C(H)OH | H |
| CH₂(CH₂)₄CH₃ | C(H)OH | H |
| CH(CH₃)₂ | C(H)OH | H |
| CH₂CH₃ | C(H)OH | OCOCH₃ |
| CH₂CH₃ | C=O | OH |
| CH₂CH₃ | C=O | OCOCH₃ |
| CH₂CH₃ | C=O | OCOCH₂(CH₂)₄CH₃ |
| CH₂CH₃ | C(H)OCOCH₃ | H |

EXAMPLE 11

The procedure of Example 3 is repeated substituting for the 13β-ethyl-20ξ-hydroxy-6-methylene-18,19-dinorpregn-4-en-3-one, stoichiometrical amounts of the corresponding 6-methylene compounds of Example 10. There are obtained the following compounds:

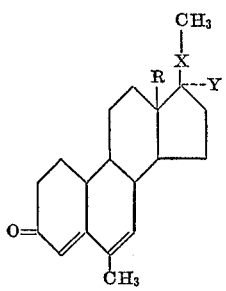

| R | X | Y |
|---|---|---|
| CH₂CH₂CH₃ | C(H)OH | H |
| CH₂(CH₂)₄CH₃ | C(H)OH | H |
| CH(CH₃)₂ | C(H)OH | H |
| CH₂CH₃ | C(H)OH | OCOCH₃ |
| CH₂CH₃ | C=O | OH |
| CH₂CH₃ | C=O | OCOCH₃ |
| CH₂CH₃ | C=O | OCOCH₂(CH₂)₄CH₃ |
| CH₂CH₃ | C(H)OCOCH₃ | H |

By the same procedure, 13β-ethyl-6-methylene-18,19-dinorpregn-4-en-3,20-dione is rearranged to 13β-ethyl-6-methyl-18,19-dinorpregna-4,6-diene-3,20-dione.

EXAMPLE 12

The procedure of Example 6 steps (b) and (c) are repeated, substituting for the 13β-ethyl-18,19-dinorpregna-3,5(6)-dien-3,20-diol, 3,20-diacetate, stoichiometrical amounts of the following compounds:

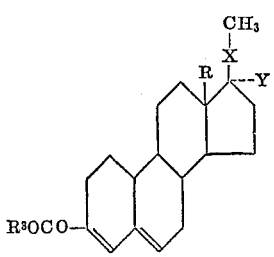

| R | X | Y | R³ |
|---|---|---|---|
| CH₂CH₂CH₃ | C(H)OCOCH₃ | H | CH₃ |
| CH₂(CH₂)₄CH₃ | C(H)OCOCH₃ | H | CH₃ |
| CH₂CH₃ | C(H)OCOCH₂(CH₂)₄CH₃ | H | CH₂(CH₂)₄CH₃ |
| CH₂CH₃ | C=O | H | CH₃ |
| CH₂CH₃ | C(H)OH | OH | CH₃ |
| CH₂CH₃ | C(H)OCOCH₃ | OCOCH₃ | CH₃ |

The following compounds are obtained:

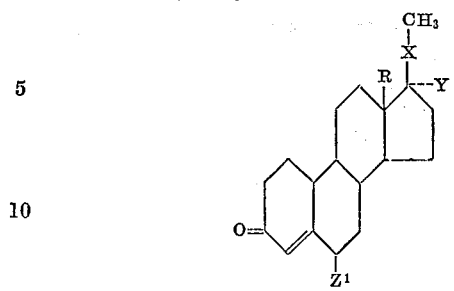

| R | X | Y | Z¹ |
|---|---|---|---|
| CH₂CH₂CH₃ | CH(H)OCOCH₃ | H | Cl |
| CH₂CH₂CH₃ | C(H)OCOCH₃ | H | Br |
| CH₂(CH₂)₄CH₃ | C(H)OCOCH₃ | H | Cl |
| CH₂(CH₂)₄CH₃ | C(H)OCOCH₃ | H | Br |
| CH₂CH₃ | C(H)OCOCH₂(CH₂)₄CH₃ | H | Cl |
| CH₂CH₃ | C(H)OCOCH₂(CH₂)₄CH₃ | H | Br |
| CH₂CH₃ | C=O | H | Cl |
| CH₂CH₃ | C=O | H | Br |
| CH₂CH₃ | C(H)OH | OH | Cl |
| CH₂CH₃ | C(H)OH | OH | Br |
| CH₂CH₃ | C(H)OCOCH₃ | OCOCH₃ | Cl |
| CH₂CH₃ | C(H)OCOCH₃ | OCOCH₃ | Br |

EXAMPLE 13

The procedure of Example 7, step (c), the chloranil dehydration, is repeated, substituting for the 13β-ethyl-6α-chloro-18,19-dinorpregn-4-en-3-on-ol, acetate, stoichiometrical amounts of the products of Example 12. There are obtained the following compounds:

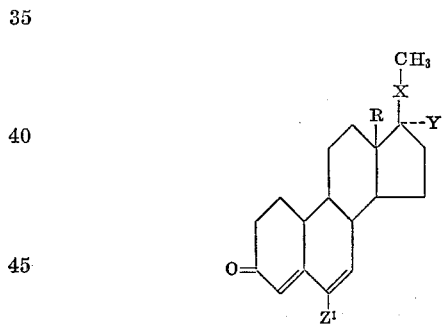

| R | X | Y | Z¹ |
|---|---|---|---|
| CH₂CH₂CH₃ | C(H)OCOCH₃ | H | Cl |
| CH₂CH₂CH₃ | C(H)OCOCH₃ | H | Br |
| CH₂(CH₂)₄CH₃ | C(H)OCOCH₃ | H | Cl |
| CH₂(CH₂)₄CH₃ | C(H)OCOCH₃ | H | Br |
| CH₂CH₃ | C(H)OCOCH₂(CH₂)₄CH₃ | H | Cl |
| CH₂CH₃ | C(H)OCOCH₂(CH₂)₄CH₃ | H | Br |
| CH₂CH₃ | C=O | H | Cl |
| CH₂CH₃ | C=O | H | Br |
| CH₂CH₃ | C(H)OH | OH | Cl |
| CH₂CH₃ | C(H)OH | OH | Br |
| CH₂CH₃ | C(H)OCOCH₃ | OCOCH₃ | Cl |
| CH₂CH₃ | C(H)OCOCH₃ | OCOCH₃ | Br |

EXAMPLE 14

The procedure of Example 7, step (c), the opening of the 6α,7α-epoxide ring with hydrogen chloride, hydrogen bromide and hydrogen fluoride, is repeated, substituting for 13β-ethyl-18,19-dinor-6α,7α-oxidopregn-4-en- 3-on-20-ol, acetate, stoichiometrical amounts of the following compounds:

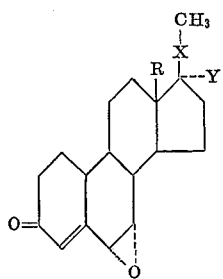

| R | X | Y |
|---|---|---|
| CH₂CH₂CH₃ | C(H)OCOCH₃ | H |
| CH₂(CH₂)₄CH₃ | C(H)OCOCH₃ | H |
| CH₂CH₃ | C(H)OCOCH₂(CH₂)₄CH₃ | H |
| CH₂CH₃ | C=O | H |
| CH₂CH₃ | C(H)OH | OH |
| CH₂CH₃ | C(H)OCOCH₃ | OCOCH |

There are obtained the following compounds:

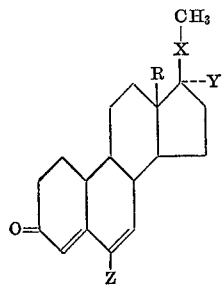

| R | X | Y | Z |
|---|---|---|---|
| CH₂CH₂CH₃ | C(H)OCOCH₃ | H | Cl |
| CH₂CH₂CH₃ | C(H)OCOCH₃ | H | Br |
| CH₂CH₂CH₃ | C(H)OCOCH₃ | H | F |
| CH₂(CH₂)₄CH₃ | C(H)OCOCH₃ | H | Cl |
| CH₂(CH₂)₄CH₃ | C(H)OCOCH₃ | H | Br |
| CH₂(CH₂)₄CH₃ | C(H)OCOCH₃ | H | F |
| CH₂CH₃ | C(H)OCOCH₂(CH₂)₄CH₃ | H | Cl |
| CH₂CH₃ | C(H)OCOCH₂(CH₂)₄CH₃ | H | Br |
| CH₂CH₃ | C(H)OCOCH₂(CH₂)₄CH₃ | H | F |
| CH₂CH₃ | C=O | H | Cl |
| CH₂CH₃ | C=O | H | Br |
| CH₂CH₃ | C=O | H | F |
| CH₂CH₃ | C(H)OH | OH | Cl |
| CH₂CH₃ | C(H)OH | OH | Br |
| CH₂CH₃ | C(H)OH | OH | F |
| CH₂CH₃ | C(H)OCOCH₃ | OCOCH₃ | Cl |
| CH₂CH₃ | C(H)OCOCH₃ | OCOCH₃ | Br |
| CH₂CH₃ | C(H)OCOCH₃ | OCOCH₃ | F |

EXAMPLE 15

13β-ethyl-17α-hydroxy-6-methyl-18,19-dinorpregna-4,6-diene-3,20-dione, acetate (a) *dl*-13β-ethyl-17α-hydroxy-6-hydroxymethyl-3-methoxy-18,19-dinorpregna-3,5-dien-20-one, acetate.—To a solution of *dl* - 13β-ethyl-6-formyl-17α-hydroxy-3-methoxy-18,19-dinorpregna-3,5-dien-20-one, acetate (1.0 g.) in tetrahydrofuran (freshly distilled, 20.0 ml.) under nitrogen at room temperature is added a solution of lithium tri-t-butoxyaluminum hydride (1.24 g.) in tetrahydrofuran (freshly distilled, 20.0 ml.) all at once. After 20 minutes at room temperature the mixture is poured into ice-water. Extraction with ether, washing the organic layer with saturated aqueous sodium bicarbonate, brine, drying over anhydrous sodium sulfate and stripping in vacuo provides a gum. Crystallization from ether/hexane affords 0.78 g. of slightly yellow colored solid; M.P. 157–162° C.;

$\lambda_{max.}^{KBr}$ 2.90, 5.80 and 5.88μ; $\lambda_{max.}^{EtOH}$ 248 mμ (ε 18,700)

(b) *dl*-13β-ethyl - 17α - hydroxy-6-methylene-18,19-dinorpregna-4-en-3,20-dione, acetate.—To a solution of oxalic acid dihydrate (3.2 g.) in methanol (320 ml.) is added *dl*-13β-ethyl-6-hydroxy-methyl-3-methoxy - 18,19-dinorpregna-3,5-dien-20-one, acetate (3.00 g.). Water (132 ml.) is added and the mixture is stirred at room temperature for 45 minutes. The mixture is poured into saturated aqueous sodium bicarbonate, extracted with ether and the extracts washed with brine and dried over anhydrous sodium sulfate. Evaporation in vacuo yields a solid which is triturated with ether to give 2.25 g. of light yellow colored product; M.P. 225–246° C. (decomposes);

$\lambda_{max.}^{KBr}$ 5.80–5.83, 6.02μ; $\lambda_{max.}^{EtOH}$ (on a previously prepared sample) 226 mμ (ε 10,900)

(c) *dl*-13β-ethyl-17α-hydroxy-6-methyl - 18,19 - dinorpregna-4,6-diene-3,20-dione, acetate.—A mixture of *dl*-13β-ethyl-17α-hydroxy-6-methylene - 18,19 - dinorpregna-4-ene-3,20-dione, acetate (0.50 g.), Pd/C (5%, 75 mg.) and sodium acetate (0.25 g.) in absolute ethanol (15 ml.) is heated at reflux for 45 minutes after which time a sample shows UV absorption at 287 mμ and no 266 mμ absorption. After cooling to room temperature the mixture is filtered through filter aid and diluted with ether. Washing with saturated aqueous sodium sulfate and stripping in vacuo yields a gum. Column chromatography on Grade III Woelm neutral alumina using 100% benzene as eluant affords 0.28 g. of colorless product on crystallization from ether/hexane; M.P. 190–191° C;

$\lambda_{max.}^{KBr}$ 5.80–5.90, 6.09, 6.21 (weak), 6.39μ (weak); $\lambda_{max.}^{EtOH}$ 287 mμ (ε 24,200)

NMR has methyl singlets at 1.93, 2.10 and 2.14 p.p.m. and vinyl protons at 5.93 and 6.02 p.p.m.

*Analysis.*—Calcd. for $C_{24}H_{32}O_4$ (percent): C, 74.97; H, 8.39. Found (percent): C, 74.84; H, 8.38.

What is claimed is:

1. 13β - ethyl-17α-hydroxy-6-hydroxymethyl-3-methoxy-18,19-dinorpregna-3,5-dien-20-one, acetate.

2. 13β-ethyl - 17α - hydroxy-6-methylene-18,19-dinorpregn-4-ene-3,20-dione, acetate.

References Cited

UNITED STATES PATENTS

| 3,228,933 | 1/1966 | Kirk et al. | 260—239.55 |
| 3,253,003 | 5/1966 | Wettstein et al. | 260—397.4 |
| 3,313,832 | 4/1967 | Maurits et al. | 260—397.3 |

HENRY A. FRENCH, Primary Examiner

U.S. Cl. X.R.

260—239.55 R, 397.3, 397.5, 999